Jan. 27, 1970     J. A. AILEO     3,491,372
HEAD GEAR WITH RETRACTABLE EYE SHIELD
Filed Nov. 13, 1967     2 Sheets-Sheet 1
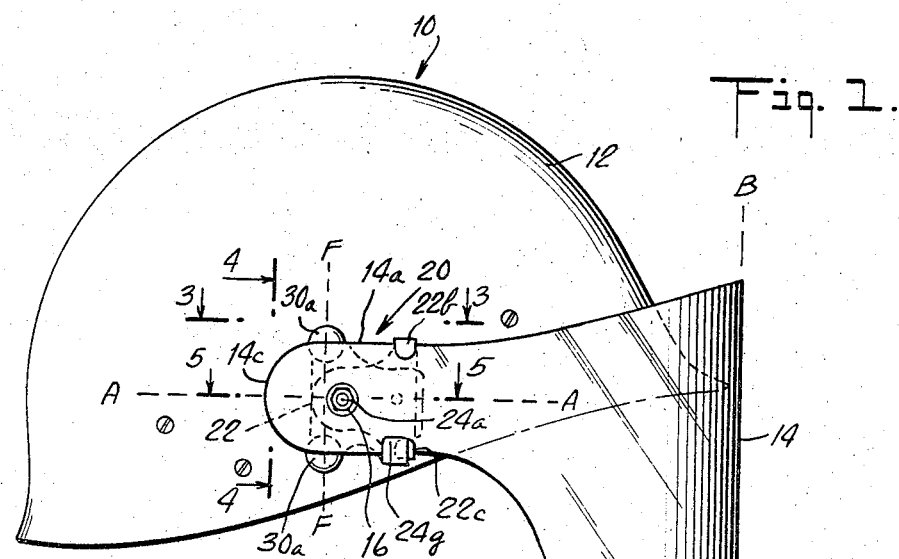
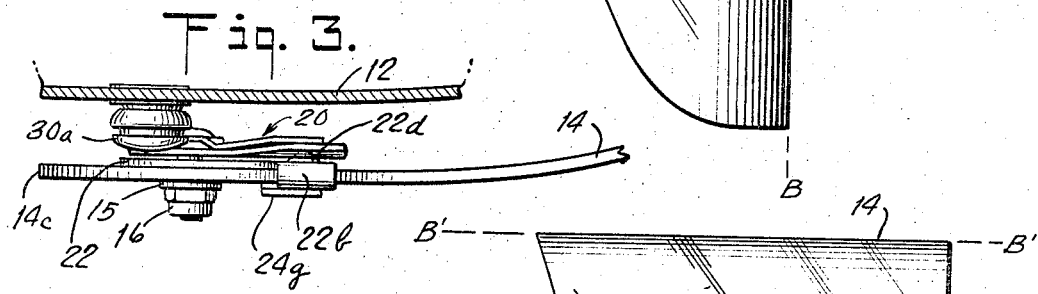
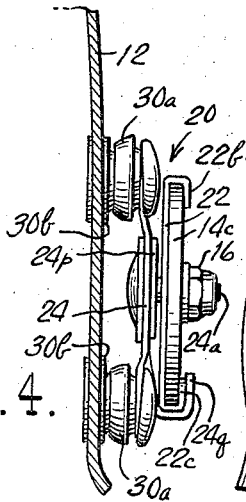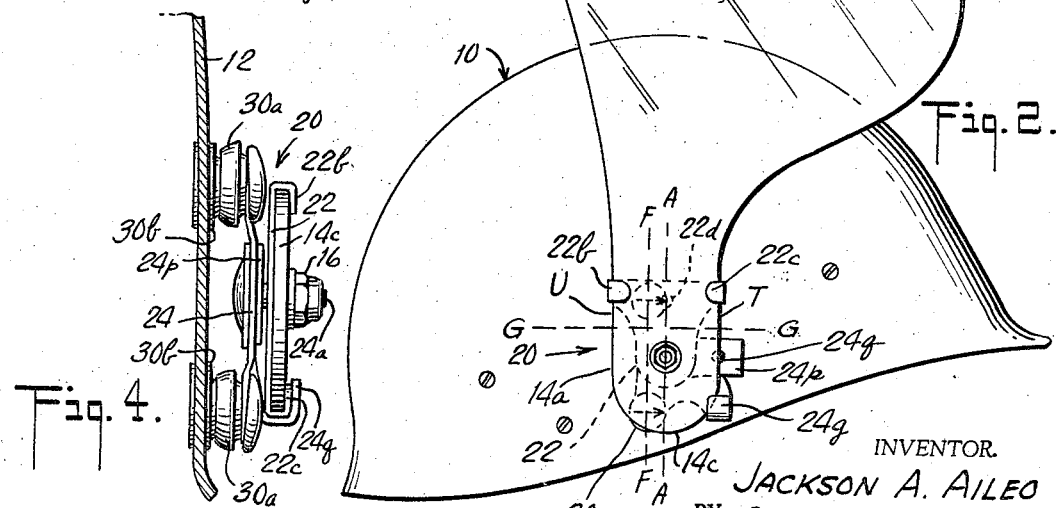
INVENTOR.
JACKSON A. AILEO
BY Lester N. Clark
ATTORNEY

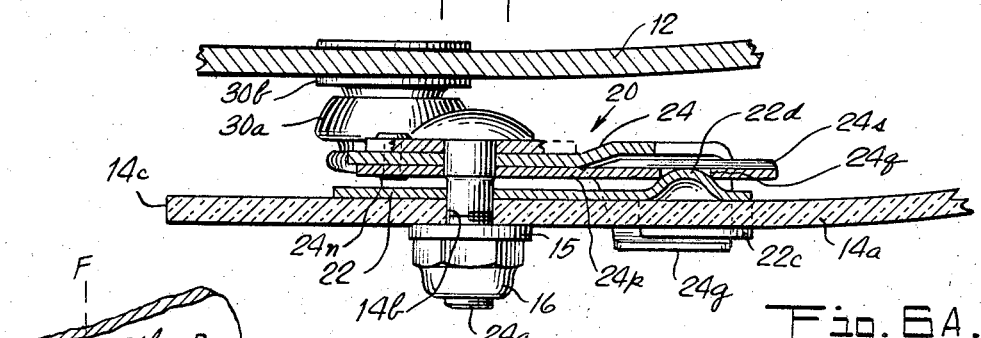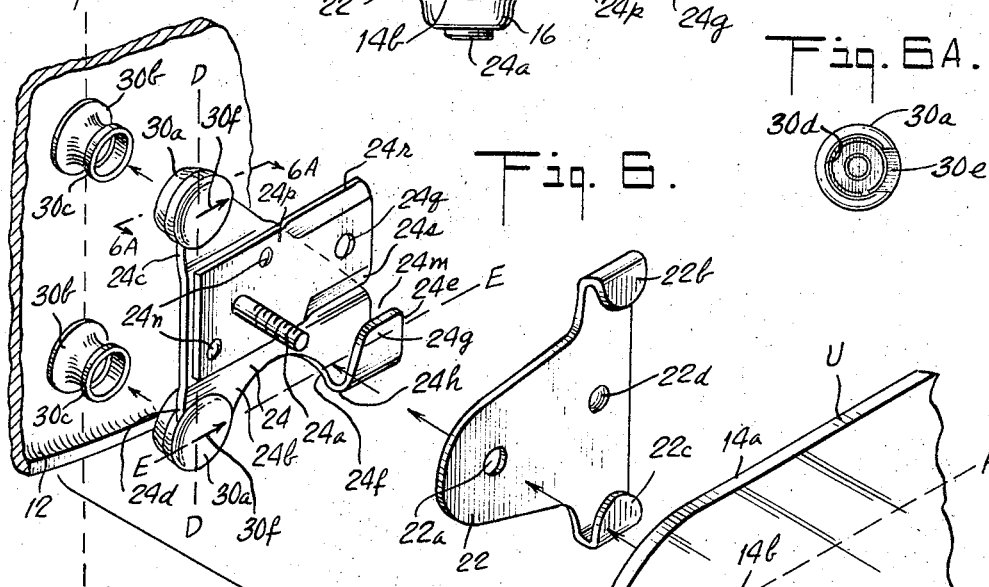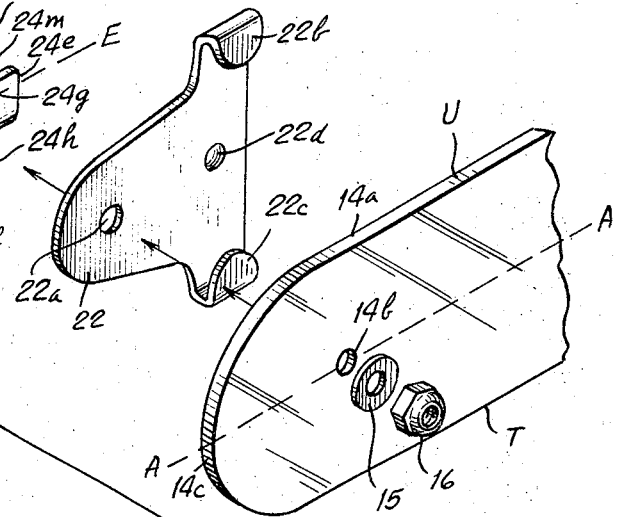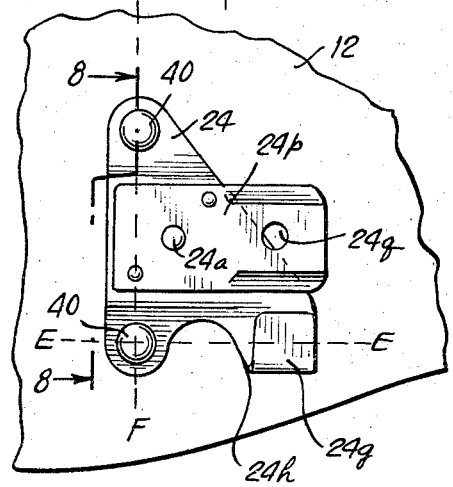

United States Patent Office 3,491,372
Patented Jan. 27, 1970

3,491,372
HEAD GEAR WITH RETRACTABLE EYE SHIELD
Jackson Anthony Aileo, Carbondale, Pa., assignor, by mesne assignments, to Gentex Corporation, Carbondale, Pa., a corporation of Delaware
Filed Nov. 13, 1967, Ser. No. 682,372
Int. Cl. A42b 1/06
U.S. Cl. 2—9                                   7 Claims

ABSTRACT OF THE DISCLOSURE

A head gear with retractable eye shield having a pivotable connection between the eye shield and a helmet portion of the head gear, adapted to effect movement of the eye shield between an eye shielding position in front of the wearer's eyes and a retracted position above the crown of the head gear, including detent means for stabilizing the eye shielding position of the eye shield. In one form, a pivot mechanism for pivotably mounting the eye shield, is itself connected to the helmet portion by a pair of snap-members at either lateral extreme of the helmet portion. A line connecting either pair of snap-members points essentially toward the crown of the helmet portion, thereby rendering it very difficult to disengage the snap-members when the eye shield is in the eye shielding position, but relatively easy to disengage the snap-members when the eye shield is in the retracted position. Unidirectional snap-members may be employed to further discriminate between the eye shielding and the retracted positions as regards the capability of removing the eye shield at the snap-members.

BACKGROUND OF THE INVENTION

Head gear with retractable eye shields are known, and one example thereof is shown in the Aileo Patent 2,860,343, issued Nov. 18, 1958. It has long been a problem to provide retractable eye shields for such head gear wherein the eye shield will be stabilized in the eye shielding position, yet capable of easy manual movement to the retracted position. Moreover, it is highly desirable in many uses, for example in uses by policemen as riot helmets, to provide the capability of easy addition or removal of an eye shield from a helmet portion. Thus, the helmet portion can be used in normal service, and the eye shield can be added when there is danger of flying objects or the like. A problem exists however, in that the means allowing the easy removability of the eye shield must not cause the accidental disengagement of the eye shield under the influence of blows or the like thereto while it is disposed in the eye shielding position. At the same time, it is highly desirable that the removability of the eye shield be manual and very simple, in particular that it not require tools or more than a casual effort on the part of the wearer. Heretofore this combination of virtues has not been provided by known prior art constructions.

BRIEF SUMMARY OF THE INVENTION

A pair of pivot mechanisms, each having a fixed portion including a pivot pin and a movable portion, are connected to the lateral extremes of a helmet portion of a head gear according to the invention, one at either side thereof. The movable portions of the pivotable mechanism are connected to the lateral extremes of an eye shield, and detent means is provided between the fixed and movable pivot mechanism portions, so as to stably locate the eye shield in the eye shielding position, while allowing relatively easy manual pivoting of the eye shield from the eye shielding position to the retracted position. snap-members, lying in a line pointing essentially to the In one embodiment, the fixed portion of the pivot mechanism is connected to the helmet portion by a pair of crown of the helmet portion, so that when the eye shield is in the eye shielding position the snap-members cannot easily be detached by tilting of the eye shield, but when the eye shield is in the retracted position, the snap-members can easily be detached by tilting of the eye shield. Unidirectional snap-members are desirable, and when employed each snap-member will be capable of detachment by moving the forward portion of the outer snap-members away from the helmet. When the shield is in its shielding position, it effectively prevents such movement. The geometry of the arrangement of the row or two snap-members on either lateral extreme of the helmet, together with the geometry of the eye shield in the eye shielding and the retracted positions, makes it almost impossible to tilt the snap-members sufficiently to disengage them when the eye shield is in the eye shielding position, but makes it very easy to tilt them sufficiently to disengage them when the eye shield is in the retracted position, thereby providing the desired secure attachment in the eye shielding position together with the ease of detachment while in the retracted position.

BRIEF DESCRIPTION OF THE FIGURES

Two illustrative embodiments of the invention are set forth hereinbelow in a detailed description of the invention with reference to the figures, in which:

FIG. 1 is a side elevation of a head gear including a pivot mechanism pivotably connecting an eye shield to the helmet portion, wherein a first embodiment of connecting means is shown for securing the pivot mechanism to the helmet portion, and illustrating the arrangement of the parts when the eye shield is in the eye shielding position;

FIG. 2 is a side elevation view similar to FIG. 1 but showing the relationship of parts when the eye shield is in the retracted position;

FIG. 3 is a view, partly in section, of the relationship of the parts shown in the eye shielding arrangement of FIG. 1 viewed along plane 3—3 therein;

FIG. 4 is a view, partially in section, showing the relationship of the parts of FIG. 1 taken along plane 4—4 therein;

FIG. 5 is a section view of the parts in the relationship shown in FIG. 1 and taken along plane 5—5 therein;

FIG. 6 is an exploded perspective view of the pivot mechanism and immediately associated helmet and eye shield portions in the eye shielding relationship shown in FIG. 1;

FIG. 6a is a detail view of one of the snap-members shown in FIG. 6 taken along plane 6A–6A therein;

FIG. 7 is a detail view of a portion of a helmet identical to that shown in FIGS. 1 and 2, wherein the fixed portion of the pivot mechanism shown in FIGS. 1-6 is connected to the helmet portion by a second embodiment of connecting means; and FIG. 8 is a section view of the structure shown in FIG. 7 taken along plane 8—8 therein.

Referring now to the figures, a head gear indicated generally at 10 includes a helmet portion 12 shaped to cover the head of a wearer, and an eye shield portion 14 pivotably connected to the helmet portion by a pair of pivot mechanisms 20 for pivoted movement between an eye shielding position indicated in FIG. 1 and a retracted position indicated in FIG. 2. The eye shield portion 14 is curved, typically transparent plastic, and includes a pair of tab portions 14a at either extreme thereof, which portions 14a are connected to the helmet portion 12 on extreme lateral portions thereof by respective ones of the pivot mechanisms 20. Viewed in full side profile, as in FIGS. 1 and 2, the eye shield portion 14 when pivotably assembled with the helmet portion 12, presents a front outline lying essentially in vertical plane B—B (FIG. 1) when the eye shield 14 is in the eye shielding position, and presents an upper outline lying essentially in horizontal plane B'—B' (FIG. 2) when the eye shield 14 is in the retracted position. The longitudinal axis A—A of each tab portion 14a is essentially perpendicular to a plane including the front of eye shield portion 14, e.g. plane B—B or B'—B'.

The eye shield portion 14, and the helmet portion 12 are identical in the two illustrated embodiments of the invention. Further, the parts of the pivot mechanisms 20 are identical in the two embodiments of the invention, but the means connecting the pivot mechanisms 20 to the helmet portion 12 differ as between the two embodiments of the invention. Accordingly, the first embodiment will be described in full, but the second embodiment will be described only as respects the means for connecting the pivot mechanisms 20 to the helmet portion 12, the remaining parts in the second embodiment being identical to the corresponding parts in the first embodiment. Identical parts in the two embodiments are designated by identical reference characters.

The first embodiment of each pivot mechanism 20 includes (FIG. 6) a plate 22 adapted to be mounted to tab 14a of eye shield 14 for pivotable movement therewith, and a pivot fixture 24 adapted to be attached to helmet portion 12. Pivot fixture 24 includes a threaded pivot pin 24a, and each of tab portions 14a and plate 22 include apertures 14b, 22a respectively. More particularly, plate 22 includes a pair of opposed channel tabs 22b, 22c adapted to grasp eye shield tab 14a at opposed upper and lower edges thereof when the tapered end 14c of tab portion 14a is inserted into the channel formed by channel tabs 22b, 22c until aperture 22a is aligned with aperture 14b. Tab portion 14a, when thus mounted with plate 22, may be received at concentric apertures 14b, 22a upon pivot pin 24a, and secured thereon by a washer 15 and nut 16, in the assembled relationship shown in FIG. 5. Plate 22 also includes a protrusion 22d, best seen in FIG. 5, from the stock of plate 22 facing away from the side of plate 22 bearing channel tabs 22b, 22c, i.e. facing away from tab portion 14a when plate 22 is assembled therewith. Protruding portion 22d may be formed by punching a dimple in the opposite surface of plate 22 in the well known manner, and is located with respect to aperture 22a so that a line therebetween is essentially congruent with the longitudinal axis A—A of the eye shield tab 14a when assembled therewith.

Pivot fixture 24 includes a base portion 24b having upper and lower ears 24c, 24d lying along an axis D—D (FIG. 6), and a bracket portion 24e spaced from the lower ear 24d along an axis E—E (FIG. 6) which is essentially perpendicular to axis D—D. The base portion 24b is essentially right triangular in outline with axes D—D and E—E forming the right angle thereof. The bracket portion 24e is essentially U-shaped, having a generally downwardly extending portion 24f and a generally upwardly extending terminal portion 24g connected by a bottom portion 24h so that the generally upward terminal portion 24g is essentially parallel to the plane of base portion 24b but spaced outwardly therefrom, to define an upward opening 24m into the U-shaped interior of bracket portion 24e. Riveted to base portion 24b by rivets 24n is a pivot plate 24p, to which is secured the pivot pin 24a. At a portion of pivot plate 24p located above bracket 24e appears an aperture 24q, and a line between pivot pin 24a and aperture 24q is essentially perpendicular to axis D—D and essentially parallel to axis E—E. Pivot plate 24p is bevelled outwardly at portions 24r and 24s immediately above and below aperture 24q. Preferably, the bevelling is effected by bending of the planar stock of plate 24p at the edges thereof, as illustrated.

Secured at each of ears 24c, 24d is a female snap-member 30a, and secured to helmet portion 12 along line F—F thereon is a pair of male snap-members 30b adapted to mate with female snap-members 30a. In general such snap-members are well known, and their principle of operation resides in the close fit of the crown 30c of the male snap-members 30b within the somewhat flexible, and inwardly curved rim 30d (FIG. 6a) of the female snap-members 30a, whereby the female snap-member 30a may be forced over the crown 30c of the male snap-member 30b for axial retention thereupon, but upon tilting of the female snap-member 30a in any direction to more than a certain minimum tilt angle, stress will be imposed upon its rim 30d allowing it to expand sufficiently in circumference to snap-off of the crown 30c allowing disengagement of the male and female parts.

In the specific illustrated embodiment shown in the figures, the female snap-member 30a is modified, in a known manner, so that tilting of the female member can only disengage it from the male member if the tilting proceeds in a single direction, rather than in any direction as was previously described. This specific unidirectional form of snap fastening is effected, in the illustrated embodiment, by a depression 30e in the rim 30d of the female snap-member 30a together with an increased degree of rigidity of the rim 30b relative to the tightness of the fit of the rim with the crown 30c of the male snap-member 30b. The rim depression 30e is located at the head of the arrow 30f which is conveniently embossed upon the exterior of the female snap-members 30a so that the location of the depression 30e may be readily ascertained. Consequently, while the female snap-members 30a may be joined axially with the male members 30b in the usual manner, they may only be snapped-off by lifting of the female snap-members 30a from the portion of the rim thereon located at the heads of arrows 30f, i.e. from the portions at rim depressions 30e. While snap-members 30a, 30b capable of being disengaged by tilting from any direction may be employed with the invention, for reasons that will be more fully explained hereinafter, it is preferred to employ unidirectional snap-members of the type illustrated and just described. Any suitable type of unidirectional snap fasteners may be employed, such as one of the fasteners shown in U.S. Patents Nos. 2,328,016, 2,767,454 and 2,898,656.

Referring now to FIGS. 7 and 8, there is shown a pivot fixture 24, just as in the first embodiment, but secured to helmet 12 by means different from the snap-members 30a, 30c of the first embodiments of FIGS. 1–6a. The pivot plate 24 shown in FIGS. 7 and 8, when secured in a pair to either side of the helmet portion 12 in the manner indicated in those figures, and when assembled with an eye shield 14, plates 22, washers 15 and nuts 16, all as illustrated in the first embodiment, forms the second embodiment of the invention. That is to say, as has been previously mentioned, the second embodiment of the invention differs from the first embodiment only in the manner of securing the pivot plate 24 to the helmet portion 12. Specifically, in FIGS. 7 and 8 a pair of rivets 40 secure pivot plate 24 to helmet portion 12 at the same locations along line F—F and E—E as has already been described with reference to the first embodiment. Other securing expedients can be substituted for the rivets 40, such as screws or the like, the essential feature being that in the second embodiment or FIGS. 7 and 8, the pivot plate 24 is secured to helmet portion 12 against removal therefrom under normal manual manipulation and stress application.

In either embodiment of the invention, the plates 22 are engaged upon the tab portions 14a so that the opposed channel tabs 22b, 22c grasp the upper and lower edges of the tab portion 14a and the apertures 14b, 22a coincide, and the eye shield assembly is then mated at apertures 14b, 22a with the pivot pins 24a on either lateral extreme of the head gear 10, and the washers 15 and nuts 16 are applied so that the parts are brought into the relationship shown in FIGS. 1–5. The lower bevelled portion 24s, when formed as bent planar stock, which is preferred as aforesaid, then provides a spring loading between plate 24p and base portion 24b, so that nut 16 is tightened thereagainst, to provide adjustable friction between plate 22 and plate 24p at all positions therebetween, with increased friction in the vicinity of the eye shielding position.

The eye shield 14 is pivotable to an eye shielding position (FIGS. 1 and 5) in which protrusion 22d of plate 22 is engaged within aperture 24q of pivot plate 24p. The parts 22d, 24q thereby act as a detent locating the eye shielding position of the eye shield 14. The eye shield 14 is further secured in the eye shielding position by the engagement of the lower channel tab 22c within the bracket portion 24e of pivot plate 24, in that further downward pivoting of the eye shield 14 is prevented by the positive support afforded to channel tab 22c, and thereby to the eye shield 14, by the bracket portion 24e.

When eye shield 14 is in the FIG. 1 position, hand pressure may be exerted upwardly thereon, until detent 22d, 24q disengages, and the whole assembly will then pivot upwardly out of the way into the retracted position shown in FIG. 2 wherein the axis A—A is essentially parallel to the line F—F. The tab portions 14a extend for a great enough length past apertures 14b therein, to tapered end 14c, so that in the retracted position they engage bracket 24e (FIG. 2) which thereby acts as a stop for the retracted position of the eye shield. Conversely, eye shield 14 may be moved manually from the retracted position to the eye shielding position, until the protrusion 22d engages bevelled portion 24r, and then with further pivoting movement until the protrusion 22d mounts the planar surface of pivot plate 24p, thereby spring loading the plate 22 and increasing the friction, and so that when the protrusion 22d comes into congruence with the aperture 24q it is urged thereinto by the spring loaded force.

In the first embodiment of FIGS. 1–6, there is the additional feature that the eye shield 14 may be removed from the helmet portion 12, so that the helmet portion 12 may be worn when no eye shield is desired. This is of course provided by the snap-members 30a, 30b. It is a feature of the invention that the geometry of the arrangement of the parts is such that the eye shield can easily be removed manually when it is in the retracted position, but is highly resistant to removal when it is in the eye shielding position, and in the specific instance of the employment of unidirectional snap-members, is virtually impossible to remove when it is in the eye shielding position.

This important feature of the invention can be explained as follows. Assuming for the moment that multidirectional snaps are employed, it will be seen that when the eye shield is in the eye shielding position illustrated in FIG. 1, an attempt to tilt the snap fastenings in either sense along the line A—A by manipulation of the main body of eye shield 14 will work against the high degree of rigidity present in the eye shield 14 when its tab portions 14a are connected to the relatively rigid helmet portion 12 at both sides thereof. When multidirectional snaps are employed, there is very little chance that a blow would be struck on the free end 14c of the tabs, which could disengage the snap-members, so in effect, even with mulitdirectional snap-members the eye shield cannot be dislodged by blows and the like when in eye shielding position of FIG. 1. On the other hand, if an attempt is made to tilt the snap fastenings along the line F—F then it will be seen that since this is the line of the snaps themselves and since there are two spaced snaps for each tab 14a a great deal of rigidity inheres along the line F—F and no tilting can be effected. Intermediate positions will of course equally resist tilting because they will include components in both of the F—F and A—A directions. Thus when the eye shield 14 is in the eye shielding position, wherein the axis A—A of the tab portions 14a is essentially perpendicular to the line F—F joining the snap fastenings, random blows or twisting movements or the like on the main eye shield surfaces cannot inadvertently disengage the eye shield from the helmet portion 12, and this is a very important safety feature and advantage.

On the other hand, when the eye shield is moved to the retracted position shown in FIG. 2, the axis A—A will move until it is either congruent with or parallel to (as illustrated) the line F—F. It is then still impossible to tilt the snap-members along the A—A or F—F lines, but it is now possible to tilt them along the G—G line. Thus when using multidirectional snap-members, the tab portions 14a may, when the eye shield 14 is in the retracted position of FIG. 2, be tilted by lifting of either the T or U edges of the tab portions 14a, and the snap-members will readily become disengaged for removal of the eye shield 14.

When instead, as is preferred, unidirectional snap-members are employed, having the ability to be opened only by lifting from a direction at the arrow heads of arrows 30f, facing forward, i.e. toward the eye shielding location of eye shield 14, all possibility of disengaging the eye shield 14 when it is disposed in the eye shielding position of FIG. 1 is removed. Thus, lifting at ends 14c cannot under any circumstances disengage the snap-members when they are unidirectional and disposed as illustrated, because such tilting force would be 180° away from the effective tilting direction. Thus still further insurance is provided against removal of eye shield 14 when in the eye shielding position, by use of unidirectional snap-members. With such unidirectional snap-members, the eye shield 14 when in the retracted position shown in FIG. 2 can be removed only by lifting at edge T so that the portion of the rim of each female snap-member 30a is lifted at the head of its arrow 30f.

It will be appreciated that the head gear 10 according to the invention provides a helmet having an eye shield which can be conveniently positioned in an eye shielding and a retracted position, and that the eye shielding position is secured by detent means so that security is afforded to the face of the wearer by the stable position of the eye shield, and yet so that the eye shield may easily be retracted under normal manual force. Moreover, in the preferred embodiment of the invention, there resides the further important advantage that the eye shield is removable from the helmet portion, but only when disposed in the retracted position and then only by an independent tilting motion of each shield tab portion performed at an angle to the plane of the side of the helmet shell, so that blows or inadvertent forces on the eye shield while in the eye shielding position cannot disengage the eye shield to expose the wearer.

The invention has been described with a certain degree of particularity and with reference to two embodiments thereof. It will be understood that many variations in the form and arrangement of parts can be practiced within the scope of the principles of the invention, and all such variations are contemplated, since the illustrated embodiments are merely illustrative, not limiting of the scope of the invention.

What is claimed is:

1. A head gear with retractable eye shield and adapted to be worn on the head, wherein the eye shield may be manipulated by the wearer to assume an eye shielding position in front of the eyes of the wearer or a retracted position above the crown of the wearer's head, comprising:

(a) a relatively rigid head covering including a crown portion with side portions extending laterally downward therefrom;

(b) an eye shield, having a central portion adapted to extend laterally in front of the wearer's face when disposed in said eye shielding position and to extend over said crown portion when disposed in said retracted position, and a pair of lateral tab portions extending from said central portion along said head covering side portions; and (c) a pair of pivot mechanisms, one each located at either of said head covering side portions, pivotally supporting said eye shield upon said head covering at respective ones of said eye shield tab portions, each said pivot mechanism being detachably secured to the adjacent one of said head covering side portions by means comprising a pair of snap-members, each of said pair of snap-members including a cooperating male and female portion, the male portions of said snap-members being affixed to the head covering side portion, spaced apart thereupon, and located so that a line therebetween points essentially to said crown portion and a longitudinal line extending along each of said eye shield tab portions through the pivot point thereon is disposed essentially perpendicular to and bisects said line connecting the adjacent male snap-member portions when said eye shield is in said eye shielding position, and essentially parallel thereto when said eye shield is in said retracted position, and the female portions of said snap-members being affixed to said pivot mechanism, spaced apart thereupon a distance sufficient for mutual engagement and disengagement with said male snap-member portions.

2. A head gear with retractable eye shield according to claim 1 wherein each of said snap-members includes means for permitting disengagement of the male and female portions thereof only under tilting force applied in a single predetermined direction, the single effective direction of tilting being from the forward portion of the head covering.

3. A head gear with retractable eye shield according to claim 1 wherein each said pivot mechanism includes a pivot fixture having a pivot pin and including a recess located forwardly of said pivot pin, and said female snap-member portions secured thereto, and a plate secured to said eye shield tab portion having means mated with said pivot pin for pivotal motion, and a protrusion located forwardly of said means, said protrusion and said recess together forming detent means adapted to stabilize said eye shield in the said eye shielding position.

4. A head gear with retractable eye shield according to claim 3 wherein each said pivot fixture is formed so as not to be engaged with said protrusion except when said eye shield is moved to the vicinity of said eye shielding position, and includes a bevelled portion adapted to initially engage said protrusion for mounting the surface of said pivot fixture adjacent said recess.

5. A head gear with retractable eye shield according to claim 4 wherein each said pivot fixture includes an upwardly open U-shaped bracket located forwardly of the lowermost of said female snap-members, adapted to intercept and support said eye shield at the lower edge of said tab portion thereof when said eye shield is in said eye shielding position and against excessive downward pivoting force thereon which would otherwise tend to overcome said detent means.

6. A head gear with retractable eye shield according to claim 3 wherein each said pivot fixture includes a base plate portion connected to said female snap-member portions, and an overlying pivot plate portion connected thereto rearwardly thereof, secured to said pivot pin, and including upper and lower inwardly inclined edges at the forward portion of said pivot plate portion, the upper inwardly inclined edge serving to allow said protrusion to mount said pivot plate portion when said eye shield is pivoted to the vicinity of said eye shielding position, and said lower inwardly inclined edge serving to spring bias the forward portion of said pivot plate by contact with the underlying base plate portion.

7. A head gear with retractable eye shield and adapted to be worn on the head, wherein the eye shield may be manipulated by the wearer to assume an eye shielding position in front of the eyes of the wearer or a retracted position above the crown of the wearer's head, comprising:

(a) a relatively rigid head covering including a crown portion with side portions extending laterally downward therefrom;

(b) an eye shield, having a central portion adapted to extend laterally in front of the wearer's face when disposed in said eye shielding position and to extend over said crown portion when disposed in said retracted position, and a pair of lateral tab portions extending from said central portion along said head covering side portions; and (c) a pair of pivot mechanisms, one each located at either of said head covering side portions, pivotally supporting said eye shield upon said head covering at respective ones of said eye shield tab portions, each said pivot mechanism being secured to the adjacent one of said head covering side portions, and including detent means engageable in the eye shielding position of said eye shield, for stabilizing that position thereof, each said pivot mechanism including a pivot fixture having a base plate portion secured to said head covering side portion, and an overlying pivot plate portion connected to said base plate portion rearwardly thereof, and including a pivot pin and a recess located forwardly of said pivot pin, upper and lower inwardly inclined edges at the forward portion of said pivot plate, said recess being positioned between said inclined edges an upwardly open U-shaped bracket located forwardly on said base plate portion and at the lower part thereof, and a plate secured to said eye shield tab portion having means mated with said pivot pin for pivotal motion, a protrusion located forwardly of said mated means, said protrusion and said recess together forming said detent means adapted to stabilize said eye shield in said eye shielding position.

References Cited

UNITED STATES PATENTS

| | | | |
|---|---|---|---|
| 2,447,083 | 8/1948 | Moeller | 2—8 |
| 2,461,604 | 2/1949 | Huntsman | 2—8 |
| 2,767,454 | 10/1956 | Johnson | 24—217 XR |
| 2,860,343 | 11/1958 | Aileo | 2—9 |
| 2,898,656 | 8/1959 | Ashworth | 24—217 |
| 3,067,426 | 11/1962 | Tompkins | 2—9 XR |

H. HAMPTON HUNTER, Primary Examiner

U.S. Cl. X.R.

24—217